United States Patent
Baker

[15] 3,678,831
[45] July 25, 1972

[54] COMPACT FOLDING REFLEX CAMERA

[72] Inventor: James G. Baker, Middlesex, Mass.
[73] Assignee: Polaroid Corporation, Cambridge, Mass.
[22] Filed: May 10, 1971
[21] Appl. No.: 141,552

[52] U.S. Cl. ................................... 95/13, 95/32, 95/42
[51] Int. Cl. ........................................... G03b 17/50
[58] Field of Search ........................... 95/13, 32, 42

[56] References Cited

UNITED STATES PATENTS

| | | |
|---|---|---|
| 3,545,357 | 12/1970 | Erlichman et al. ................ 95/13 |
| 3,561,339 | 2/1971 | Erlichman ........................... 95/13 |
| 3,561,340 | 2/1971 | Erlichman ........................... 95/13 |

Primary Examiner—Samuel S. Matthews
Assistant Examiner—Richard A. Wintercorn
Attorney—Brown & Mikulka, Alfred E. Corrigan and John S. Vale

[57] ABSTRACT

A compact, folding reflex camera formed by a plurality of housing sections and a thin walled, light opaque, flexible envelope, coupled together for relative movement between folded and extended positions. When the camera is extended, the envelope forms a chamber, within the extended housing sections, having openings therein through which light is selectively transmitted during viewing and exposure modes of operation. In the viewing mode of operation, one of the openings functions as part of the camera's optical system by forming an entrance pupil for a viewing device, mounted on one of the housing sections, which is adapted to permit viewing of an image formed within the chamber.

17 Claims, 6 Drawing Figures

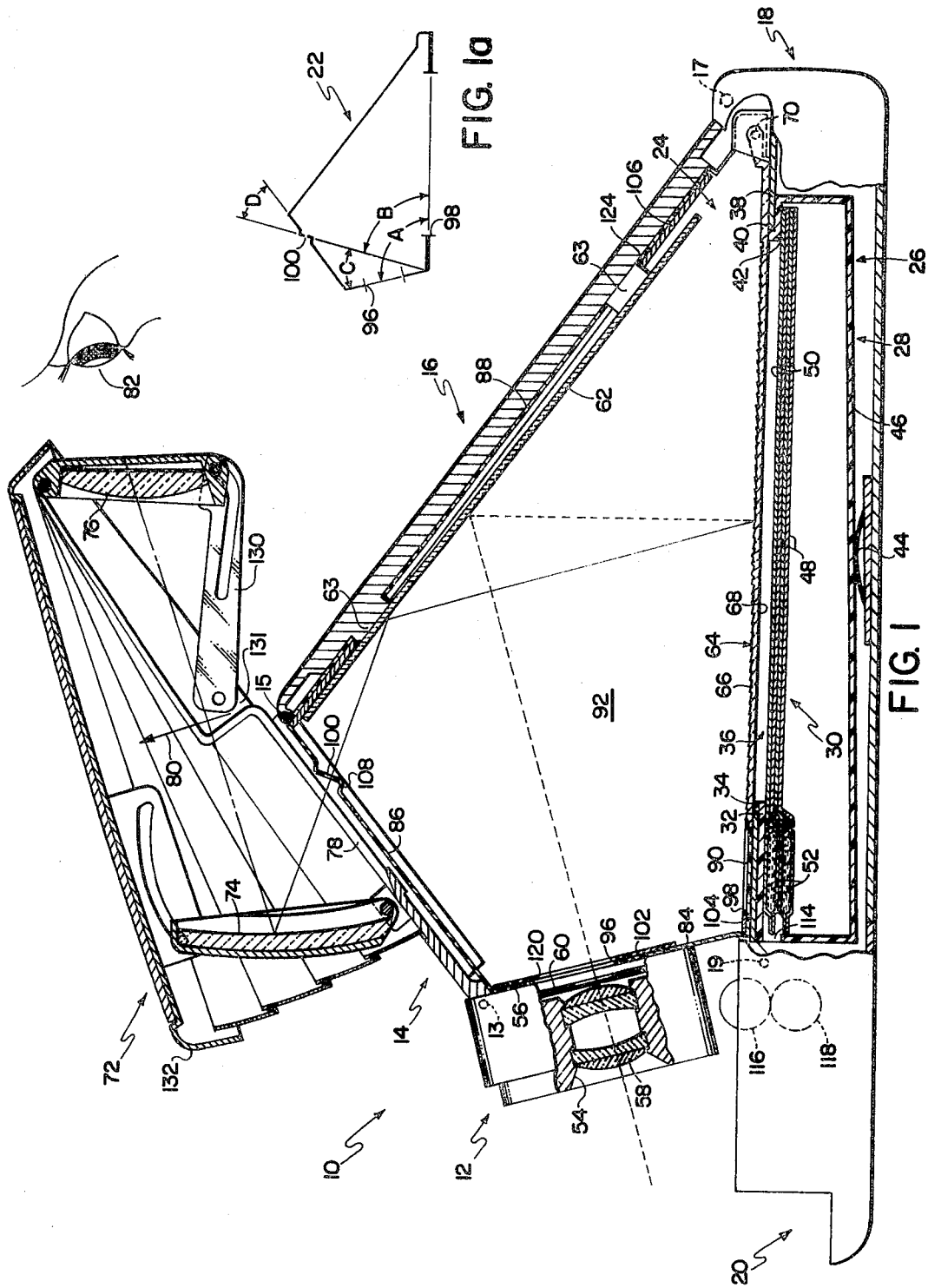

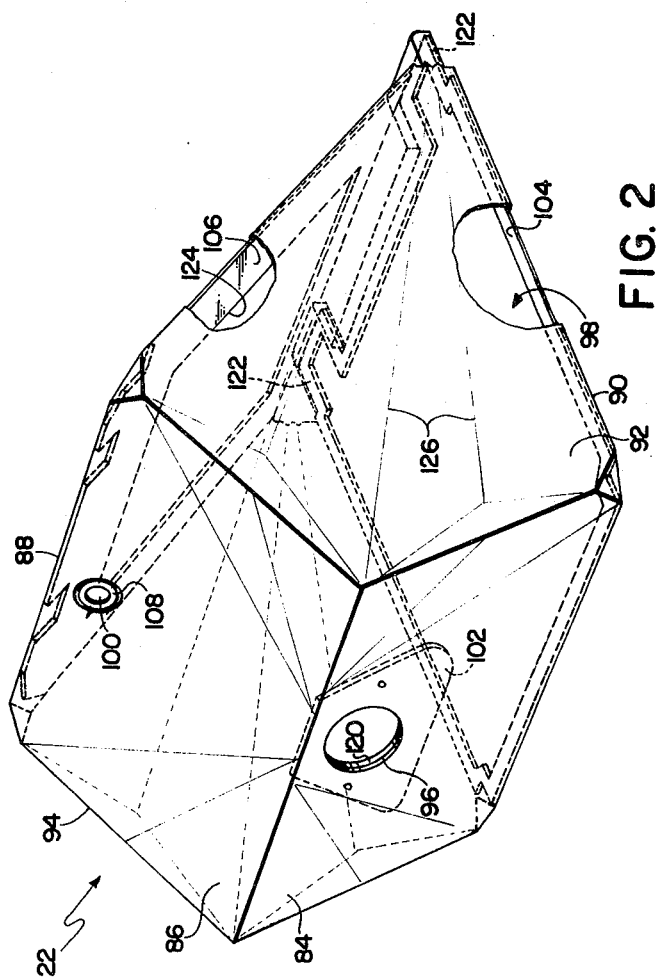

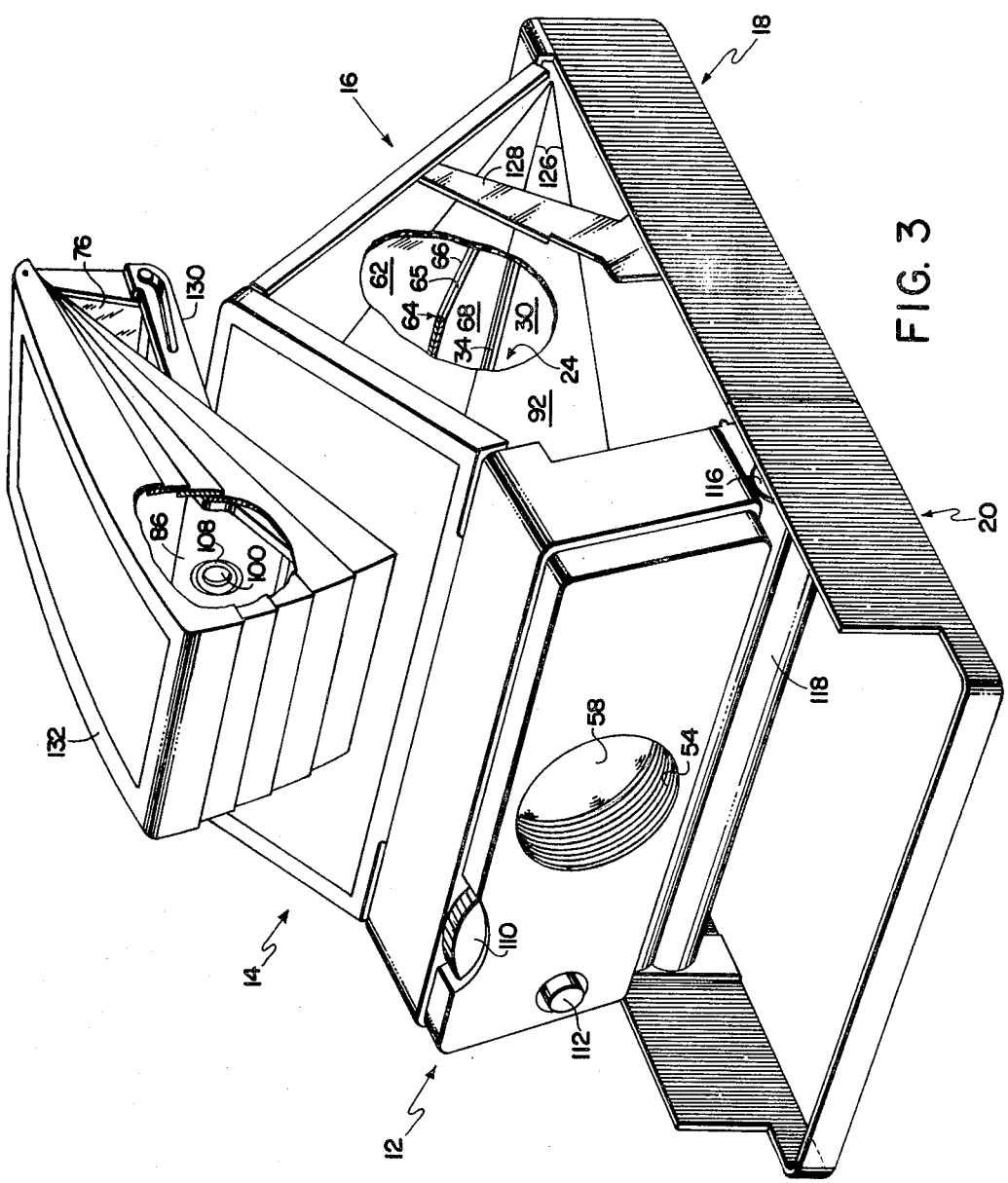

PATENTED JUL 25 1972 3,678,831

INVENTOR.
JAMES G. BAKER

BY
Brown and Mikulka
and
John S. Vale
ATTORNEYS

3,678,831

COMPACT FOLDING REFLEX CAMERA

BACKGROUND OF THE INVENTION

1. Field of the Invention

This invention relates to the field of compact, folding, reflex cameras.

2. Description of the Prior Art

A recent innovation in the field of foldable photographic apparatus is a compact folding camera employing a compressed or folded optical path between the objective lens and the exposure plane. These cameras occupy less relative volume, in both the folded and extended configurations, than a traditional straight line optical path folding camera using the same size film format and having an optical system which covers a similar field of view to the same depth of focus.

A compact folding camera of this general type is disclosed in the U. S. Pat. No. 3,479,941, and generally includes a plurality of rigid housing sections pivotally coupled to one another at their ends to form an articulated structure which is movable between folded and extended positions. A base section is provided with means for supporting a photosensitive element, or film unit, at an exposure plane. A lens housing is pivotally coupled to the base section, near one end of the exposure plane, and is movable relative thereto between a folded position, in which the lens housing is located in end-to-end relation with the base section, and an extended position in which the lens housing forms an obtuse included angle with the base section. When the lens housing is in the extended position, the objective lens is located above the exposure plane and the optic axis of the lens is tilted such that the lens axis intersects an extension of the exposure plane at an acute angle. Positioning the lens in this manner permits the lens axis to be located closer to the exposure plane, thereby reducing the height or vertical dimensions of the extended camera.

Another housing section is pivotally coupled to the base section near the opposite end of the exposure plane and supports a mirror which is positionable, when the camera is extended, with its reflective surface located in an inclined plane extending upwardly and over the exposure plane so that the plane of the reflective surface intersects the exposure plane at an acute angle of less than 45°, also reducing the vertical dimensions of the extended camera. Light transmitted through the objective lens impinges on the mirror and is reflected downwardly to the exposure plane where it forms a focused image of a scene and causes exposure of the film unit.

The lens housing and mirror housing sections are joined at their ends by a support housing section which is adapted to accurately position and stabilize the other three housing sections in the extended position. When the camera is folded, the support housing section and the mirror housing section are positioned in overlying relation to the base and lens housing sections such that the folded camera assumes a compact parallelepiped shape.

When the camera is extended, the above mentioned four housing sections cooperate to form four side walls of an exposure chamber. The two remaining end walls of the exposed chamber are formed by metal bellows, comprising a plurality of interlocking blades, which are secured to and adapted to move with the housing sections between the folded and extended positions. While the interlocking blade bellows function extremely well, they are complex and expensive to manufacture and require that a certain amount of space be set aside within the folded camera for their storage. Also, in order to completely light seal the exposure chamber, it is necessary to provide light seals at the connecting points between adjacent movable housing sections thereby adding to the cost of manufacturing the camera.

An improved version of the compact folding camera is disclosed in U.S. Pat. No. 3,630,130, issued to Irving Erlichman on Dec. 28, 1971. Included in this camera is a thin walled, flexible, light opaque envelope which is secured to the movable housing sections such that it forms a lighttight exposure chamber within the four housing sections and the metal bellows when the camera is extended. The envelope has three openings therein, the first being aligned with the lens, the second with an aperture behind which a film unit is adapted to be supported at the exposure plane, and a third surrounding the mirror, to permit light transmission through the envelope during the course of a photographic exposure. The envelope eliminates the need for lightsealing the joints between the housing sections and allows the bellows to be modified such that they are less complex to manufacture and require less storage space when the camera is folded. Therefore, the addition of the envelope reduces the manufacturing cost of the camera and also permits the reduction of its overall size in the folded configuration.

Both of the above described cameras utilize a separate direct viewing viewfinder/rangefinder. Or, in other words, viewing and focusing is accomplished through a separate viewing optical system while exposure of the film unit is via light transmitted through the lens and reflected from the internal mirror. As in all camera systems of the direct viewing type, parallax is a major problem resulting in framing errors.

To overcome the parallax problem and other disadvantages associated with direct viewing and focusing, the compact, folding camera's optical system has been adapted for single lens reflex operation. This permits the user to frame and focus on the scene to be photographed through the camera's objective lens, thus he is assured that the scene as viewed through the viewing device will be the same one which is recorded on the film unit. The conversion to single lens reflex operation of the type contemplated herein requires the addition to the optical system of a reflex member having a focusing screen on one side and a planar reflective surface on the opposite side. The reflex member is pivotally coupled to the base housing section near the end of the exposure plane adjacent the mirror housing section end is adapted for movement between a viewing position and an exposure position. In the viewing position, the reflex member is in overlying relation to the film unit supported at the exposure plane so that light passing through the lens forms an image of the scene on the focusing screen via reflection from the mirror. During the exposure mode of operation, the reflex member is pivoted upwardly to uncover the film unit and is positioned adjacent to and parallel with the mirror. Light passing through the lens is then reflected from the planar reflective surface on the underside of the reflex member to cause exposure of the film unit.

Light emanating from the image on the focusing screen is directed upwardly toward the mirror from where it is reflected toward the support housing section coupled between the lens and mirror housings. A reflex type of viewing device for receiving the reflected light is adapted to be mounted on the support housing section, and therefore, provisions must be made for the transmission of light through the envelope and into the viewing device. It is also preferable that the light pass through a viewing device entrance pupil, or limiting aperture stop, positioned between, and at a predetermined angle relative to the viewing device and the mirror to improve the optical quality of an image formed by the viewing device. From an economic standpoint it is desirable to incorporate this aperture stop into the thin walled, opaque envelope such that in addition to its lightsealing function, it also functions as part of the camera's optical system.

Other desirable characteristics of the envelope include thinness and flexibility so that it may be collapsed in a predetermined manner to occupy a minimum of space in the folded camera. Also, it should be attached to the housing section such that it moves automatically with the housing sections between the folded and extended positions without the need to manually erect or fold the envelope. When erected, the envelope must form a chamber having predetermined dimensions which are repeatable to insure accurate placement of the viewing device entrance pupil and to insure sufficient clearance between the chamber end walls and the movable reflex member.

U. S. Pat. No. 1,642,935, issued to Mihalyi, discloses a traditional or straight line optical path folding camera which is adapted to employ a reflex type of viewing syStem. The envelope or bellows coupled between the lens mount and the exposure plane of the camera base has three openings therein. One opening is aligned with the lens, the second with the exposure plane, and the third with a viewing device.

The first and second openings are contained in planes which are parallel to one another since this camera does not utilize the more compact obtuse angle relation between the lens mount and the exPosure plane which is a distinguishing feature of the compact type folding camera. The third opening provides access to an offset extension of the bellows which is oriented at an acute angle relative to the exposure plane and provides a shaded optical path for a viewing device or eye lens mounted at the top of the extension. The folding camera and bellows arrangement, disclosed in the above mentioned patent, is also distinguishable from the compact, folding, reflex camera for the following reasons. The third opening, connecting the main portion of the bellows to the offset extension, does not function as part of the camera's optical system as evidenced by the fact that the opening is wider than the cone of light emanating from an image on the focusing screen, therefore, it does not serve as a limiting aperture. The bellows is not adapted to automatically move with the housing sections between the folded and extended positions, but rather is adapted for manual operation. Also when the bellows is fully extended, its side walls remain pleated indicating that the bellows is not under stress and, therefore, its interior dimensions may not be repeatable each time the camera is moved from the folded to the extended position.

SUMMARY OF THE INVENTION

The present invention relates to a compact, folding, camera of the type having a reflex optical system. The camera includes a housing having a plurality of sections, including first, second, and third sections, which are interconnected for relative movement between folded and extended positions. A thin walled envelope formed of a flexible, light opaque material and having first, second, and third openings therein is coupled to the housing in a lighttight manner for movement with the sections between the folded and extended positions. In the extended position, the envelope forms a chamber within the camera with the first and second openings positioned in obtusely disposed planes adjacent the first and second housing sections, respectively, and the third opening positioned adjacent the third housing section, to provide access for light transmission into and out of the chamber. Exposure means, e.g., an objective lens and shutter assembly, are supported by the first housing section and are aligned with the first opening in the envelope for selectively admitting light reflected from a scene into the chamber. Means are provided in the second section for positioning a film unit in alignment with the second opening in the envelope such that light may pass from the chamber therethrough to cause exposure of the film unit. The camera further includes reflex means, or a reflex member, movable within the chamber between a viewing position in which it prevents the passage of light through the second opening and provides an image of the scene from the light admitted into the chamber by the exposure means, and an exposure position in which it directs light from the lens through the second opening to cause exposure of the film unit. A viewing device, supported by the third housing section, is aligned with the third opening in the envelope for viewing the image provided by the reflex means, located in the viewing position, in preparation for exposing the film unit.

The camera further includes a fourth housing section interconnected with the first, second, and third housing sections for relative movement between the folded position and the extended position in which the four housing sections cooperate to form a four-sided articulated structure. The thin walled envelope is configured to form a six-sided chamber within the four-sided articulated structure. The six-sided chamber includes four substantially planar side walls, disposed such that they are substantially parallel with the first, second, third, and fourth housing sections, respectively, and two substantially planar end walls depending from the four side walls and disposed in parallel relation with one another.

The optical system further includes reflecting means, e.g., a mirror, supported within the chamber by the fourth housing section, for reflecting light admitted by the exposure means, or lens, and the first opening in the envelope onto the reflex member located in the viewing position to form an image of the scene. The reflex member is configured such that light emanating from the image on the focusing side of the reflex member is directed toward the reflecting means from where it is reflected through the third opening in the envelope and into the viewing device to permit viewing of the image. The third opening in the envelope functions as part of the camera's optical system by forming an entrance pupil for the viewing device for selectively limiting the light reflected therethrough to improve the quality of an image formed by the viewing device.

The third opening in the envelope is contained in a recessed portion or depression in the side wall of the chamber adjacent the third housing section such that it is tilted at a predetermined angle relative to the side wall, the optical means, and the optical axis of the viewing device.

The reflex means or reflex member is configured to have substantially linear lateral edges which are positioned adjacent to and parallel with the end walls of the chamber formed by the extended envelope. The envelope is formed of an elastomer material, and at least that portion of the envelope which forms the end walls of the chamber is stressed, or stretched, when the camera is located in the extended position. This maintains the end walls in a substantially planar condition thereby insuring sufficient clearance between the lateral edges of the reflex means and the end walls of the chamber to prevent binding therebetween when the reflex means is moved between the viewing and exposure positions.

Therefore, it is an object of the present invention to provide a compact, folding, reflex camera having a plurality of sections, including first, second, third, and fourth sections, interconnected for relative movement between folded and extended positions; a thin walled, flexible, light opaque envelope having first, second, and third openings therein; means coupling the envelope to the housing in a lighttight manner for movement with the sections between a folded position and an extended position in which the envelope forms a chamber with the first and second openings, respectively, positioned adjacent the first and second housing sections and the third opening positioned adjacent the third housing section, to provide access for light transmission into and out of the chamber; exposure means supported by the first housing section and aligned with the first opening for selectively admitting light reflected from a scene into the chamber; means within the second section for positioning a film unit in alignment with the second opening in the envelope such that light may pass from the chamber therethrough to cause exposure of the film unit; reflecting means supported by the fourth housing section for redirecting light admitted by the exposure means toward the second opening; reflex means, movable within the chamber between viewing and exposure positions; and a viewing device supported by the third housing section and aligned with the third opening in the envelope for viewing an image provided by the reflex means located in the viewing position.

It is another object of the present invention to provide a compact, folding camera of the type described wherein the first and second openings in the envelope are located in obtusely disposed planes when the camera is extended.

It is yet another object of the present invention to provide a compact, folding, reflex camera of the type described in which the third opening in the chamber functions as part of the camera's optical system by forming an entrance pupil for the viewing device.

It is a further object of the present invention to provide a compact, folding, reflex camera of the type described in which the thin walled envelope is formed of an elastomer material and the envelope is attached to the housing sections such that when the camera is extended, the end walls of the chamber formed by the envelope are in a stressed condition to prevent binding between the end walls and the movable reflex means within the chamber.

Other objects of the invention will in part be obvious and will, in part, appear hereinafter.

The invention accordingly comprises the apparatus possessing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of a camera embodying the instant invention shown in its extended or operative position;

FIG. 1a is a diagrammatic illustration of an extended envelope showing the angular relation between three openings therein;

FIG. 2 is a perspective view of an envelope, partly in section, shown in its extended or operative position with means for coupling the envelope to the camera shown in dotted lines;

FIG. 3 is a perspective view of the camera embodying the instant invention in its extended or operative position, partly in section, to show selected components of the camera's optical system;

DESCRIPTION OF THE PREFERRED EMBODIMENT

Figure 4:
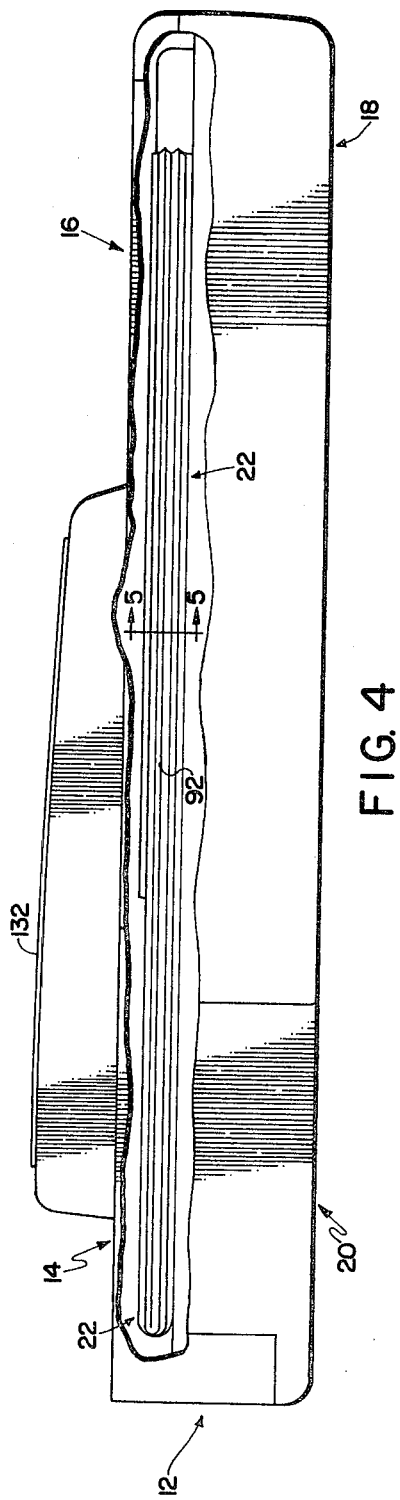
FIG. 4 is an elevational view, partly in section, of the camera shown in FIGS. 1, 2, and 3 in its folded or inoperative position.

Referring now to FIGS. 1 through 5 of the drawings, a compact, folding, single lens reflex camera of the self-developing type is shown generally at 10 in its extended or operative position. Camera 10 includes a housing formed by a plurality of sections 12, 14, 16, and 18 pivotally coupled to one another at pivots 13, 15, 17, and 19 (see FIG. 1) for relative movement between folded and extended positions as shown in FIGS. 4 and 1, respectively, and a section 20 extending forwardly of housing section 18.

When extended, housing sections 12, 14, 16, and 18 cooperate to form a four-sided articulated structure or support frame for supporting a film container and components of the camera's optical and exposure control system. Secured to the interior walls of housing sections 12, 16, and 18 is a thin walled, light opaque, flexible envelope 22 which is adapted to move with the housing sections between the folded position as shown in FIG. 4, and the extended position, shown in FIGS. 1, 2, and 3, in which it forms a six-sided chamber 24 within the four articulated housing sections. Envelope 22 is secured to the housing in a lighttight manner and has appropriate openings therein providing access for selective light transmission into and out of the chamber while excluding the entry of ambient light, as will be described in detail hereinafter.

Housing section 18 includes a chamber 26 for receiving a film container 28 preloaded with a plurality of film units 30 arranged in stack relation within the container. Access for loading container 28 is provided by rotating housing section 20 downwardly in a counterclockwise direction to expose an open end of chamber 26.

Film container 28 includes a forward wall 32 having an upstanding rib 34 which defines a generally rectangular light transmitting section or aperture 36 through which actinic radiation is adapted to pass to expose the forwardmost film unit 30. Film container 28 is supported within chamber 26 at its forward wall 32 by a plate-like support frame 38 having a rectangular opening 40 therein through which upstanding rib 34 of the film container is adapted to be inserted in telescoping fashion to accurately locate the forwardmost film unit at a horizontal exposure plane 42 within camera 10. A support spring 44, secured to the interior surface of the bottom wall of housing section 18 is adapted to engage a rear wall 46 of the film container and urge it upwardly to hold container 28 securely against support frame 38.

Film unit 30 contains all of the components required to produce a positive photographic print and generally includes a photosensitive element 48, a superposed transparent image receiving element 50, and, joined to both elements at one end, a rupturable pod 52 containing a processing fluid which is adapted to be spread between and in contact with both elements, subsequent to exposure, for forming a positive image by a diffusion tranSfer process, as is well known in the photographic art. For details as to the construction of film units 30, reference may be had to U. S. Pat. No. 3,415,644, granted on Dec. 10, 1968, to E. H. Land, and assigned to the same assignee as the instant invention.

Housing section 12 is pivotally coupled to one end of housing section 18, at pivot 19, for movement between the folded position shown in FIG. 4 and the extended position shown in FIGS. 1 and 3. A central opening 54 extends through housing section 12 and terminates at its rear planar wall 56. Mounted within opening 54 is an adjustable focus objective lens 58 for forming an image of the scene to be photographed and a shutter assembly 60 actuable for selectively blocking and unblocking the passage of light through objective lens 58 and the opening 54 in the rear wall 56 of housing section 12. Housing section 12, and therefore the opening 54 in the rear wall of the housing section, is disposed in a plane which forms an obtuse angle with the horizontal exposure plane 42. Or, in other words, the optic axis of lens 58 intercepts the horizontal exposure plane 42 at an acute angle.

Housing section 16 is pivotally coupled to the opposite end of housing section 18 and is movable with the housing sections between the folded position as shown in FIG. 4 and the extended position as shown in FIGS. 1 and 3. A main function of housing section 16 is to support a planar mirror 62 at an acute angle of less than 45° relative to the horizontal exposure plane 42. The mirror is secured to three bosses (only two of which are shown) or inwardly extending platforms 63 which are disposed in a triangular pattern to provide mirror 62 with support at three points. In the extended position, as shown in FIG. 1, light passing through objective lens 58 impinges upon the reflective surface of planar mirror 62 and is reflected downwardly toward the exposure plane 42 thereby establishing a folded or compressed optical path between the objective lens and the exposure plane.

Positioned over the exposure aperture 36 of the film container 28 is a light opaque reflex member 64 which prevents exposure of the forwardmost film unit 30 by actinic radiation reflected from mirror 62. Reflex member 64 is in the form of a rectangular plate-like element having linear lateral edges 65 (see FIG. 3) and is provided with a Fresnel type mirror or other echelon type focusing screen 66 on one side and a planar reflective surface 68 on its opposite side. As best shown in FIG. 1 reflex member 64 is pivotally coupled at one end to housing section 18 at pivot 70 for movement between a viewing and focusing position and an exposure position. In the viewing and focusing position, reflex member 64 rests atop support frame 38 in lighttight engagement with the upstanding rib 34 of the film container and has the Fresnel mirror side 66 facing upwardly toward housing sections 16 and 14. Light passing through lens 58 is reflected via planar mirror 62 onto the Fresnel surface where it forms an image of the scene to be photographed.

Housing section 14 is pivotally coupled at its ends between housing sections 12 and 16, at pivots 13 and 15, and in addition to maintaining the housing sections in their predetermined optical and spacial alignment also supports a viewing device shown generally at 72. Viewing device 72 is of the folding variety and is shown in its extended position in FIGS. 1 and 3. The optical components of the viewing device include an ellipsoidal shaped mirror 74 and an eye lens 76.

Light rays emanating from the image formed at the Fresnel focusing screen 66 are reflected upwardly and impinge upon planar mirror 62 from where they are reflected through an opening 78 in housing section 14 and into the viewing device 72. The light rays strike ellipsoidal mirror 74 and are focused into an aerial image of the focusing screen 66 as represented by an arrow 80. The aerial image is then magnified by the eye lens 76 thus permitting the user to view the image on the focusing screen 66 through the viewing device 72 from an eye station 82 located behind the eye lens 76.

During the exposure mode of operation, reflex member 64 is pivoted upwardly about pivot 70 in a clockwise direction (see FIG. 3) to an exposure position in which it is adjacent to and parallel with planar mirror 62 mounted on housing section 16. In the exposure position, the planar reflective surface 68 on the underside of reflex member 66 faces the objective lens 58 and light passing through the lens is reflected from surface 68 through the exposure aperature 36 of the film container to cause exposure of the forwardmost film unit 30.

It will be noted that in the viewing and focusing position, the image of the scene formed by lens 58 is focused on focusing screen 68 which is vertically spaced from the horizontal exposure plane 42. When reflex member 64 is moved to the exposure position, the reflective surface 68 is positioned or spaced forwardly of the reflective surface of mirror 62 so that the length of the optical path from objective lens 58 to the reflective surface 68 and then to the exposure plane 42 is of the same length as the optical path from the lens to the focusing screen 66 when reflex member 64 is located in the viewing and focusing position.

As noted earlier, camera 10 is provided with a thin walled, flexible, light opaque envelope 22 which is secured to housing sections 12, 16, and 18 and is movable with housing sections 12, 14, 16, and 18 between the folded position as shown in FIG. 4 and the extended position, as best seen in FIGS. 1, 2, and 3, in which it forms a six-sided chamber 24. The function of envelope 22, in its extended position, is to exclude ambient light from chamber 24 and to provide openings in alignment with the objective lens and shutter opening 54, rectangular opening 40 in support frame 38, and the viewing device opening 78, through which light is selectively transmitted during the viewing and exposure modes of operation.

Envelope 22 is shown in its extended position in FIG. 2 and includes substantially planar sidewalls 84, 86, 88, and 90, and two end walls 92 and 94. It is configured to fit within the space defined by housing sections 12, 14, 16, and 18 with side walls 84, 86, 88, and 90 being positioned closely adjacent to and parallel with the interior surfaces of 12, 14, 16 and 18, respectively, and end walls 92 and 94 disposed in parallel relation with one another. At the trailinG end of the envelope, side walls 88 and 90 and end walls 92 and 94 cooperate to form an extension of chamber 24 for receiving the reflex member 64 pivotal structure. Side wall 84 contains a first opening 96 which is positioned in alignment with opening 54 at the rear wall of housing section 12. A second opening 98, in side wall 90, is located in alignment with rectangular opening 40, and a third opening 100, in side wall 86, is positioned in alignment with the opening 78 in housing section 14. Means for coupling envelope 22 to the housing sections are provided by attachment plates 102, 104, and 106.

It will be noted that opening 100, through which light is reflected from mirror 62 to the viewing device 72 during the viewing and focusing mode of operation, is situated in a wall of a depressed or recessed portion 108 formed in side wall 86 of the envelope, as best seen in FIG. 1. The function of the depression 108 is to locate opening 100 in a plane which is tilted at an acute angle with the plane containing side wall 86 such that the opening is positioned at a predetermined angle relative to the fixed mirror 62 and the optical axis of the viewing device 72. Opening 100 is relatively small, about a tenth of an inch in diameter, and thus it serves as a limiting stop or entrance pupil for the viewing device 72. Light rays emanating from the focusing screen 66 converge after reflection from mirror 62 to form a narrow cone of light which is then transmitted through opening 100 to the ellipsoidal mirror 74. The small diameter of opening 100 acts as a limiting aperture thereby selectively limiting transmission to the center portion of the cone of light which considerably improves the quality of the image formed by the viewing device at arrow 80 by reducing aberrations most commonly associated with light at the outer peripheral edges of the cone. The tilting of the opening further improves the quality of the image by compensating in part for differential magnification of the image produced by ellipsoidal mirror 74 and eye lens 76. Therefore, opening 100 in addition to permitting light transmission from mirror 62 to the viewing device 72 functions as part of the camera's optical system to improve the quality of the image of the scene as viewed through the viewing device.

During the viewing and focusing mode of operation, shutter 60 is in its normal opened position and reflex member 64 is positioned over the exposure plane 42. The user views the image formed on focusing screen 66 while adjusting objective lens 58 by means of a focusing wheel 110, which is mounted in housing section 12 and mechanically coupled to lens 58, (see FIG. 3) until the image on the focusing screen 66 is in sharp focus. Once the image is in sharp focus, a shutter release button 112, mounted on housing section 12, is actuated to initiate an exposure control cycle which produces the following sequence of operations. First, the normally open shutter 60 closes and a blocking member (not shown) blocks aperture 100 in envelope 22 thus causing exposure chamber 24 to assume a lighttight condition. Reflex member 64 is pivoted upwardly about pivot 70 to the exposure position closely adjacent to and parallel with fixed mirror 62. Shutter 60 is then opened to admit light into the exposure chamber 24 which is reflected from the reflecting surface 68 on the underside of reflex member 64 onto the forwardmost film unit 30 at the exposure plane 42 thereby causing exposure of the film unit. After an appropriate exposure interval, the shutter 60 closes and the reflex member 64 is pivoted downwardly to its viewing and focusing position thus capping the exposure aperture 36 in the film container, after which the shutter 60 is opened and the viewing device opening 100 in the envelope is unblocked.

Subsequent to exposure, the exposed film unit 30 is automatically advanced, by means not shown, forwardly through a withdrawal slot 114 in the forward end wall of film container 28 and into engagement with a pair of pressure applying rollers 116 and 118 which are adapted to apply compressive pressure to the film unit as it is advanced therebetween. The application of compressive pressure causes pod 52 to rupture, thereby dispensing the processing fluid contained therein which is then uniformly distributed between and in contact with the photosensitive element 48 and the image receiving element 50 to initiate the diffusion transfer process.

A more detailed description of the optical system employed in the instant camera may be found in the copending U. S. Pat. application of J. G. Baker, Ser. No. 98,356, filed Dec. 15, 1970, and assigned to the same assignee as the instant invention.

The design of envelope 22 is influenced by the following factors. The envelope should be thin walled and flexible so as to be easily folded into the narrow storage space provided between housing sections 12 and 18, and 14 and 16 when the camera is folded, as best shown in FIG. 4. Additionally, the envelope must be opaque to light, resistant to tearing and abrasion, and not form a permanent set when folded or extended for long periods of time. It also should be able to withstand a temperature range of minus 20° to plus 200° F., be chemically inert to the commonly used photochemicals and resist components of the ambient environment such as ozone. The envelope should be formed of an elastomer material so that selected areas of the envelope may be placed under stress or tension when the camera is extended and be easily and inexpensively manufactured.

Suitable envelopes may be formed of polyurathane, silicone rubber, neoprene rubber, and preferably ethylene-propylene-diene rubber.

Ethylene-propylene-diene rubber envelopes may be formed having wall thicknesses of 30 mils or less, preferably in the 10 to 15 mil range, by conventional dipping or molding processes. Carbon black or other suitable fillers may be added to achieve the necessary level of opaqueness. Such envelopes have been found to have good folding characteristics, elasticity, and a long service life in terms of ability to withstand repeated flexing without developing cracks or light leaks along molded fold lines.

The shape of the extended envelope conforms to that of an opening formed between the extended housing sections 12, 14, 16, and 18. Openings 96, 98, and 100 are disposed in predetermined planes to conform to the folded optical path between the objective lens 58 and the viewing device 72. As best seen in FIG. 1a, openings 96 and 98 are disposed in planes which intersect to form an obtuse included angle A. A plane containing opening 100 intersects with; a plane containing opening 98 to form an acute included angle B; a plane containing opening 96 to form an acute included angle C; and a plane containing side wall 86 to form an acute included angle D.

Envelope 22 is secured to the housing sections in a lighttight manner by means of relatively rigid retaining rings or frames 102, 104, 106. Side wall 84 of envelope 22 is placed against the rear wall 56 of housing section 12 with the first opening 96 in alignment with opening 54 of the housing section 12 and is secured in that position by retaining frame 102 which is attached by any suitable means through the envelope to the rear wall 56. Retaining ring 102 has an opening 120 therein of sufficient diameter so as not to obstruct the passage of light through lens 58. The bottom side wall 90 of envelope 22 is secured to support frame 38 in housing section 18 by a generally rectangular retaining frame 104 having rearward extensions 122 at the trailing end thereof to accommodate the pivotal connection structure between reflex member 64 and housing section 18 at pivot 70. Retaining ring 104 is configured such that the peripheral edges of reflex member 64 fit within retaining ring 104 when the reflex member is in the viewing and focusing position. It will be noted that the spacing between the linear lateral edges 65 (see FIG. 3) of reflex member 64 and the end walls 92 and 94 of the extended envelope is preferably of the order of 110 mils. Therefore, it is preferable that end walls 92 and 94 assume a substantially planar condition when in the extended position so as to prevent binding between the end walls 92 and 94 and the linear lateral edges 65 of reflex member 64 as the reflex member is moved between the viewing and exposure positions. Side wall 88 is secured to housing section 16 by a substantially rectangular retaining frame 106 having an opening 124 therein dimensioned so that the mirror mounting platforms or bosses 63 may extend therethrough to accurately position mirror 62 as best shown in FIG. 1. The side wall 88 has appropriate openings (not shown) therein to accommodate the mounting bosses 63 so that side wall 88 may be held securely against the interior surface of housing section 16. In another embodiment, mirror 62 may be mounted directly to the interior surface of housing section 16 thus eliminating mounting bosses 63. Envelope 22, in this case, is modified to include a fourth opening located in side wall 88. The fourth opening is dimensioned to be coextensive with the reflective surface of mirror 62 and retaining ring 106 is configured to secure side wall 88 to the interior surface of housing section 16 adjacent to the outer peripheral edges of the mirror.

It should be noted that side wall 86 is not secured to housing section 14 in order that envelope 22 may be folded into the position shown in FIG. 4 without placing any portion of the envelope 22 under stress. In the extended position, the end walls 92 and 94 are designed to be stressed in the vertical direction only to insure that these walls will assume a planar condition to prevent binding with reflex member 64 as it is moved between the viewing and exposure positions. It is undesirable to stress walls 92 and 94 in a horizontal direction because this necessarily involves causing the end walls to be stored in a stressed condition when folded, which may lead to weakening of the envelope or cause a permanent set in the material which may adversely effect the dimensional stability of the erected envelope. It is particularly important not to stress side wall 86 in either the extended or folded positions as this may cause a shift in the position of opening 100 thereby resulting in an undesirable effect on the camera's optical system.

Figure 5:
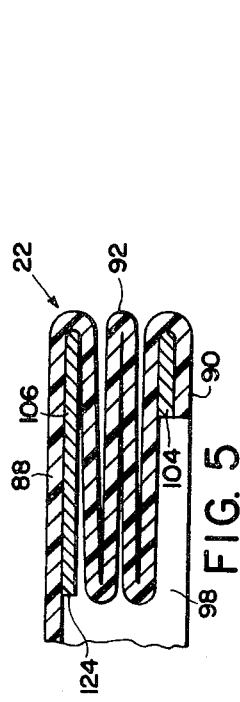
FIG. 5 is an enlarged framentary view taken along the line 5—5 in FIG. 4 of a section of the envelope shown in its folded condition.

Envelope 22 is formed with permanent crease lines 126 (see FIG. 2) notably on end walls 92 and 94 and also portions of side walls 84 and 86 to facilitate the folding of the envelope into the folded position, as shown in FIG. 5, in a predetermined and repeatable manner.

Camera 10 is maintained in the extended position by an erecting link 128 (see FIG. 3), pivotally coupled at one end to housing section 16 and slidingly coupled to housing section 18 at the other end, which is adapted to lock when the housing sections reach the fully extended position. To fold camera 10, erecting link 128 is unlatched and a downward pressure is applied to the viewing device 72 or to one of the housing sections 14 or 16. The downward pressure causes hOusing section 12 to rotate in a counterclockwise direction about pivot 19 into the forward portion of housing section 20 which is adapted to form a protective cover over objective lens 58, focusing wheel 110, and shutter release button 112. Housing sections 14 and 16 form a substantially planar wall positioned in overlying relation to the rear wall 56 of housing section 12 and the upper portion of housing section 18. Envelope 22 collapses along the fold or memory lines 126 into a compact flat structure as best shown in FIGS. 4 and 5.

As the camera is folded, the link 130 between housing section 14 and the eye lens 76 engages the outer surface of housing section 16 causing the eye lens to be pivoted in a clockwise manner to its folded position in a recess 131 in housing section 14. The cover 132 of the viewing device is manually moved downwardly causing mirror 74 to rotate in a clockwise manner to its folded position overlying the forward portion of housing section 14. The cover 132 of viewing device 72 is adapted to be latched to the outer surface of housing section 16 by a latching mechanism (not shown) and serves to releasably lock the housing sections in the folded position as shown in FIG. 4. Further details as to the construction and operation of viewing device 72 may be found in the U.S. Pat. application, Ser. No. 141,554 of Peter Costa and Edward Cughlan, filed on even date herewith and assigned to the same assignee as the instant invention.

It should be noted that after the release of erecting link 128, the camera is closed in one smooth motion without manual manipulation of envelope 22 which is adapted to automatically move with the housing sections to assume its folded condition. The camera is erected by unlatching the cover 132 of viewing device 72 and then raising either housing sections 14 or 16 to the erected position until erecting link 128 automatically locks. Again, the envelope is automatically moved with the housing sections to assume its extended configuration with end walls 92 and 94 being under stress to prevent binding of the movable reflex member 64 therewith.

From the foregoing it can be seen that there has been disclosed a compact, folding, reflex camera characterized by the novel combination of a plurality of movably interconnected housings sections and a thin walled, flexible, light opaque envelope coupled together for movement between a folded position in which the envelope assumes a flat compact configuration requiring a minimum amount of storage space within the camera and an extended position in which the envelope forms a viewing and exposure chamber. The envelope as described has openings therein, disposed in predetermined planes for cooperating with openings in the housing sections to provide access for light transmission into and out of the chamber during viewing and exposure modes of camera operation. One of the openings in the envelope functions as part of the camera's optical system by forming an entrance pupil for a viewing device. Also, the envelope disclosed is formed of an elastomer material and the end walls of the chamber are adapted to be stressed when the camera is extended to maintain the end walls in a planar condition thereby insuring sufficient clearance between the end walls and a movable reflex member.

Since certain changes may be made in the above compact folding reflex camera without departing from the scope of the invention herein involved, it is intended that all matter contained in the above description or shown in the accompanying drawings shall be interpreted as being illustrative and not in a limiting sense.

I claim:

1. A compact, folding, reflex camera comprising:
    a housing having a plurality of sections, including first, second, third, and fourth sections, interconnected for relative movement between folded and extended positions;
    a thin walled envelope formed of a flexible, light opaque material and having first, second, and third openings therein;
    means coupling said envelope to said housing in a lighttight manner for automatic movement with said sections between a folded position and an extended position wherein said envelope forms a chamber within said camera with said first and second openings, respectively, positioned adjacent said first and second housing sections and said third opening positioned adjacent said third housing section, to provide access for light transmission into and out of said chamber;
    exposure means supported by said first section and aligned with said first opening in said envelope for selectively admitting light reflected from scene into said chamber;
    means within said second section for positioning a film unit in alignment with said second opening in said envelope such that said light may pass from said chamber therethrough to cause exposure of the film unit;
    reflecting means supported by said fourth housing section for redirecting said light admitted by said exposure means toward said second opening;
    reflex means, movable within said chamber between a viewing position in which it prevents passage of said light through said second opening and provides an image of said scene from said light, and an exposure position in which it directs said light through said second opening to cause exposure of the film unit; and
    a viewing device supported by said third housing section and aligned with said third opening in said envelope for viewing said image provided by said reflex means, located in said viewing position, in preparation for exposing the film unit.

2. A compact, folding, reflex camera as defined in claim 1 wherein said first and second openings in said envelope are positioned in obtusely disposed planes when said camera is located in said extended position.

3. A compact, folding, reflex camera as defined in claim 2 wherein said third opening in said envelope functions as part of said camera's optical system when said reflex means is in said viewing position.

4. A compact, folding, reflex camera as defined in claim 3 wherein said third opening forms an entrance pupil for said viewing device.

5. A compact, folding, reflex camera as defined in claim 2 wherein said reflecting means is supported within said chamber by said fourth housing section for reflecting said light admitted by said exposure means and said first opening onto said reflex means located in said viewing position to form said image of said scene.

6. A compact, folding, reflex camera as defined in claim 5 wherein said reflex means is configured such that light emanating from said image is directed toward said reflecting means from where it is reflected through said third opening in said envelope and into said viewing device to permit viewing of said image provided by said reflex means through said viewing device.

7. A compact, folding, reflex camera as defined in claim 6 wherein said viewing device forms an image of said scene from said light reflected through said third opening, and said third opening is configured and positioned to form an entrance pupil for said viewing device for selectively limiting said light reflected therethrough to improve the quality of said image formed by said viewing device.

8. A compact, folding, reflex camera as defined in claim 7 wherein said third opening in said envelope is disposed so as to be contained in a plane which is tilted at a predetermined angle relative to a plane containing a reflective surface of said reflecting means and an optical axis of said viewing device.

9. A compact, folding, reflex camera as defined in claim 1 wherein said housing sections cooperate to form a four-sided articulated structure and said thin-walled envelope is adapted to form a six-sided chamber within said four-sided articulated structure.

10. A compact, folding, reflex camera as defined in claim 9 wherein said six-sided chamber includes four substantially planar side walls disposed such that they are substantially parallel with said first, second, third and fourth housing sections, respectively, and two substantially planar end walls depending from said four side walls and disposed in parallel relation with one another.

11. A compact, folding, reflex camera as defined in claim 10 wherein said side wall of said envelope containing said third opening further includes a recessed portion and said third opening is in a wall of said recessed portion to tilt said opening at a predetermined angle relative to an optical axis of said viewing device when said camera is in said extended position.

12. A compact, folding, reflex camera as defined in claim 11 wherein said reflex means is configured having substantially linear lateral edges disposed adjacent to and parallel with said end walls of said chamber formed by said extended envelope.

13. A compact, folding, reflex camera as defined in claim 12 wherein said thin-walled, flexible, light opaque envelope is formed of an elastomer material.

14. A compact, folding, reflex camera as defined in claim 13 wherein at least that portion of said envelope which forms said end walls of said chamber is stressed when said camera is located in said extended position to maintain said end walls in a substantially planar condition thereby insuring sufficient clearance between said lateral edges of said reflex means and said end walls of said chamber to prevent binding therebetween when said reflex means is moved between said viewing and exposure positions.

15. A compact, folding, reflex camera as defined in claim 14 wherein said end walls are stressed in a vertical direction when said camera is located in said extended position.

16. A compact, folding, reflex camera as defined in claim 2 wherein planes containing said second and third openings in said extended envelope intersect to form an acute included angle therebetween.

17. A compact, folding, reflex camera as defined in claim 2 wherein planes containing said first and third openings in said extended envelope intersect to form an acute included angle therebetween.

* * * * *